United States Patent
Boehm et al.

(10) Patent No.: US 7,641,274 B2
(45) Date of Patent: Jan. 5, 2010

(54) WINDOW ARRANGEMENT FOR A VEHICLE AND METHOD FOR THE PRODUCTION THEREOF

(75) Inventors: Hubert Boehm, Greifenberg (DE); Gerit Erbeck, Neuching (DE); Werner Paetz, Hofstetten (DE); Helmut Teschner, Landsberg am Lech (DE); Swen Vilsmayer, Krailling (DE)

(73) Assignee: Webasto AG, Stockdorf (DE)

( * ) Notice: Subject to any disclaimer, the term of this patent is extended or adjusted under 35 U.S.C. 154(b) by 69 days.

(21) Appl. No.: 10/546,423

(22) PCT Filed: Feb. 18, 2004

(86) PCT No.: PCT/DE2004/000302

§ 371 (c)(1),
(2), (4) Date: May 16, 2006

(87) PCT Pub. No.: WO2004/073976

PCT Pub. Date: Sep. 2, 2004

(65) Prior Publication Data

US 2006/0232093 A1    Oct. 19, 2006

(30) Foreign Application Priority Data

Feb. 19, 2003    (DE) ................ 103 06 957

(51) Int. Cl.
*B60J 7/00* (2006.01)
(52) U.S. Cl. .................. 296/216.09; 296/211
(58) Field of Classification Search .......... 296/211, 296/184, 96.19, 146.15, 215, 93, 96.21, 84.1, 296/216.09; 52/204.5, 208
See application file for complete search history.

(56) References Cited

U.S. PATENT DOCUMENTS

| 2,750,312 | A | | 6/1956 | Bloom, Jr. et al. |
| 4,509,791 | A | * | 4/1985 | Bienert et al. .......... 296/216.09 |
| 4,543,283 | A | | 9/1985 | Curtze et al. |
| 4,857,376 | A | | 8/1989 | Von Reis et al. |
| 6,565,980 | B1 | * | 5/2003 | Ackermann ............... 428/425.6 |
| 6,867,893 | B2 | | 3/2005 | Pätz et al. |
| 6,908,147 | B2 | | 6/2005 | Teschner |
| 6,942,288 | B2 | | 9/2005 | Paetz et al. |
| 2004/0160090 | A1 | * | 8/2004 | Teschner .................... 296/211 |

FOREIGN PATENT DOCUMENTS

| DE | 4323140 A1 | 12/1994 |
| DE | 197 21 853 A1 | 12/1998 |
| DE | 19803435 C1 * | 8/1999 |
| EP | 1025986 A1 | 8/2000 |
| FR | 2720328 A1 | 12/1995 |
| GB | 1399124 | 6/1975 |

* cited by examiner

*Primary Examiner*—Glenn Dayoan
*Assistant Examiner*—Melissa A Black
(74) *Attorney, Agent, or Firm*—David S. Safran; Roberts Mlotkowski Safran & Cole, P.C.

(57) ABSTRACT

An arrangement for closing an opening of a vehicle and a corresponding manufacturing method, in which a shattering protection element (30, 30A, 30B) is fixed to a pane or to a functional element (60) fixed at the pane. The pane and the shattering protection element are connected via a permanently elastic adhesive connection (12) to the vehicle body or to a holding element (18) connected to the vehicle body.

40 Claims, 12 Drawing Sheets

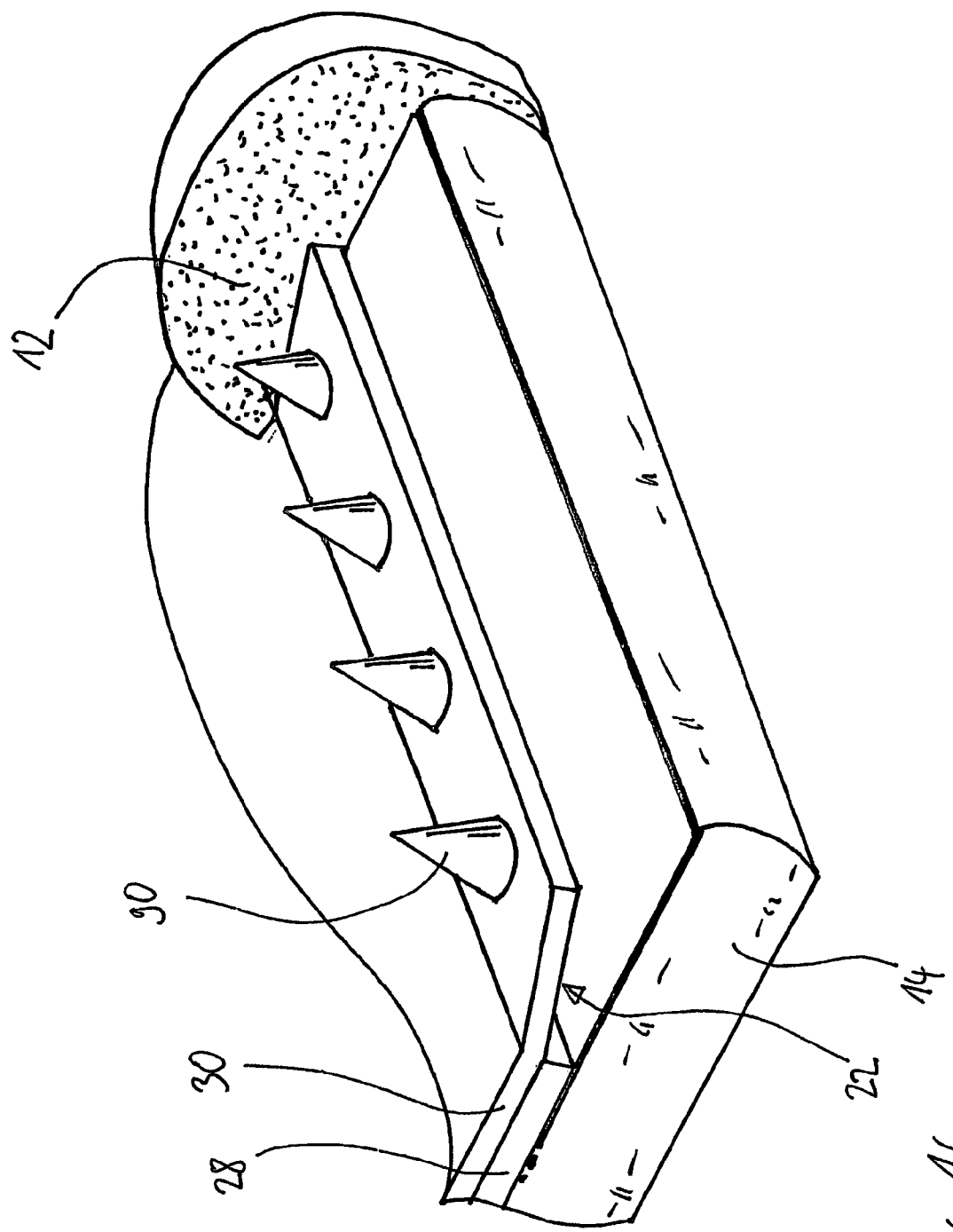

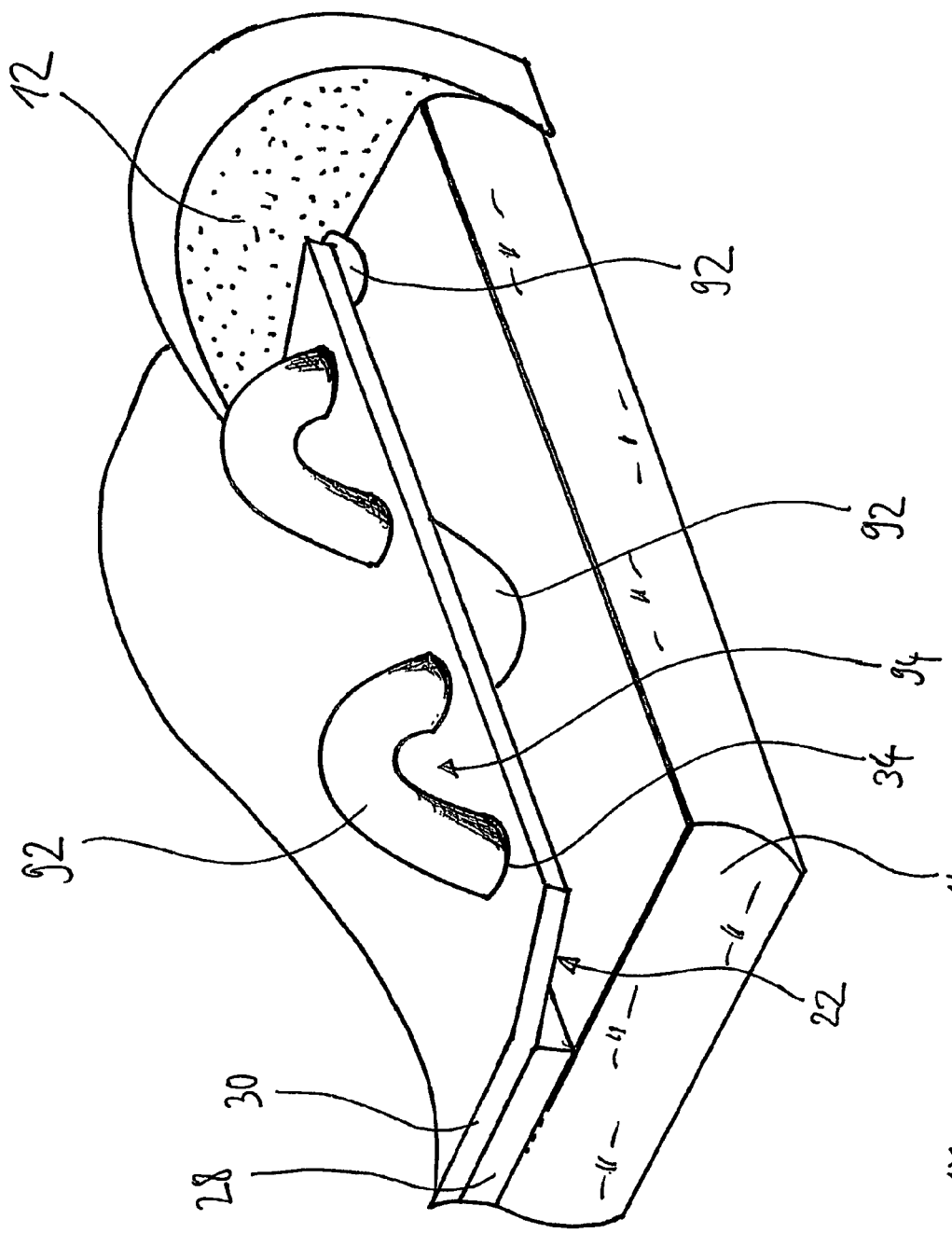

WINDOW ARRANGEMENT FOR A VEHICLE AND METHOD FOR THE PRODUCTION THEREOF

BACKGROUND OF THE INVENTION

1. Field of Invention

The present invention relates to an arrangement for closing an opening of a vehicle, which comprises a pane and a shattering protection element connected to the pane, as well as a method for manufacturing such an arrangement.

2. Description of Related Art

From German Patent Application DE 43 231 40 A1, a pane arrangement for a movable roof panel of a vehicle roof is known, wherein a glass pane is provided at its lower side with a layer of amorphous silicon and wherein, in the central region of the pane, a transparent polyethylene terephtalate (PET)-foil is fixed via an adhesive foil. The periphery of the PET-foil extends into a polyurethane foamed frame of the panel edge, which frame also serves to fix an inner panel frame to the lower side of the pane.

The German Patent Application DE 101 51 156.6 (and corresponding U.S. Patent Application Publication 2004183342) describes a glass panel for a vehicle roof wherein a pane made of safety glass is provided with a foamed frame by which a support arrangement, for example, an inner panel frame, is fixed at the lower side of the pane. In the central region of the glass pane, a shattering protection foil is fixed, via an adhesive foil, at the lower side of the pane or at the lower side of a solar cell foil composite fixed at the lower side of the pane, wherein the shattering protection foil is embedded within the foamed frame in the peripheral region of the glass pane or is mechanically fixed at the support arrangement. In the first case, the periphery of the shattering protection foil is provided with holes for achieving good anchoring within the foamed frame.

The German Patent Application DE 102 06 717.1 (and corresponding U.S. Pat. No. 6,908,147) describes a similar glass panel, wherein the further information is given that the shattering protection foil may be provided with a defined non-smooth surface structure or may be printed or may be coloured for achieving an optically satisfying appearance.

German Patent Application DE 35 21 115 A1 (and corresponding U.S. Pat. No. 4,543,283) relates to a pane arrangement for a window of a motor vehicle comprising a glass pane heaving a shattering protection layer fixed to the pane via an elastic intermediate layer of PVB or PU or having a shattering protection pane made of polyester, wherein the pane and the layers fixed thereto are embedded within a gasket frame of injection moulded PU, which is connected to the vehicle body.

German Patent DE 2 247 644 relates to a windshield arrangement for motor vehicles comprising a glass pane and a flexible plastic layer fixed at the lower side of the glass pane, wherein the periphery of the plastic layer is fixed, via an adhesive band, to a frame fixed to the vehicle body for holding the pane arrangement within the frame. In this case there is no direct contact between the adhesive band and the glass pane.

It is known from U.S. Pat. No. 2,750,312 to connect, via a tape made of reinforced fabric material, the periphery of a plastic layer arranged between two panes to a frame extending around the periphery.

German Patent Application DE 36 32 472 A1 (and corresponding U.S. Pat. No. 4,857,376) relates to a pane arrangement for a motor vehicle comprising a glass pane and a shattering protection foil made of a polyester foil having a scratching-proof coating, wherein the shattering protection foil is fixed at the lower side of the glass pane via an adhesive foil of PVB, wherein the pane and the two foils together are fixedly connected to an injection molded gasket frame of PU serving to hold the pane within an opening of the vehicle body. Several options for achieving a good connection between the foils and the gasket frame are described. Among others, it is proposed to provide holes penetrating through the foils in regions in which the two foils extend beyond the edge of the glass pane into the gasket frame, wherein further the option is mentioned to insert a hollow rivet into each of such holes. It is further proposed to glue an upper element onto the projecting regions of the foils onto the PVB foil. Alternatively, it is proposed to bend the foils in the projecting peripheral region for creating a thickened region or to insert insertion elements or a U-shaped profile into the bent projecting peripheral region of the foils within the gasket frame.

SUMMARY OF THE INVENTION

It is a primary object of the present invention to provide an arrangement comprising a pane with a shattering protection element for closing an opening of a vehicle, wherein good and inexpensive protection of the passengers and the passenger compartment in the case of breakage of the pane is provided.

It is a further object to provide for a corresponding manufacturing method enabling simple manufacturing of such an arrangement.

The invention achieves these objects by the arrangements and corresponding manufacturing methods described herein.

All solutions in accordance with the present invention are beneficial in that, upon breakage of the pane, the shattered pieces of the broken pane adhere to the shattering protection element and that, since the shattering protection element is fixedly connected to the holding element or the vehicle body, respectively, the shattering protection element is kept in place by the support element or the vehicle body, respectively. Hereby, it can be prevented that passengers are thrown out through the broken pane or that articles and shattered pieces of the broken pane may penetrate into the passenger compartment through the broken pane, or that, in case of destruction of the pane due to burglary, the passenger compartment remains closed.

The solution by which the shattering protection element is fixed to the pane or to a functional element fixed at the pane, and the pane and shattering protection element are connected via a permanently elastic adhesive connection to said vehicle body or to a holding element connected to said vehicle body is particularly beneficial in that no foamed frame is required to be provided on the pane, so that the invention may be used for vehicle side-windows or vehicle windshields.

The solution by which the shattering protection element is fixed over its entire surface to the pane or to a functional element fixed at the pane and is connected via a permanently elastic adhesive connection or via a foamed frame to the vehicle body or to a holding element connected to said vehicle body, and wherein the shattering protection element is provided with means for increasing the bond between the shattering protection element and the adhesive connection or foamed frame, respectively, is particularly beneficial in that, due to the attachment of the shattering protection element at the pane or the functional element, respectively, over its entire surface, particularly simple manufacturing is enabled, while at the same time, due to a special design of the shattering protection element, nevertheless, a sufficient bond between the shattering protection element and the holding element or the vehicle body, respectively is ensured.

The solution by which the shattering protection element is fixed to the pane or to a functional element fixed at said pane, and is connected via a permanently elastic adhesive connection or a foamed frame to a holding element connected to said vehicle body, and wherein the surface of the shattering protection element is provided with means for increasing the bond between said shattering protection element and said adhesive connection or said foamed frame, respectively, is particularly beneficial in that, by correspondingly treating the surface of the shattering protection element, even without a complicated perforation of the shattering protection element, sufficient bonding between the shattering protection element and the holding element is achieved.

The solution by which the shattering protection element is fixed to the pane or to a functional element fixed at said pane, and is connected via a permanently elastic adhesive connection or a foamed frame to the vehicle body or to a holding element connected to the vehicle body, and wherein, for increasing said bond between said shattering protection element and the adhesive connection or foamed frame, respectively, at least one of the surfaces of the shattering protection element has been roughened or provided with a primer system or with an added structure having a roughened surface, or both surfaces are provided with an elongated structure passing alternately through openings at both surfaces of said shattering protection element, thereby forming eyelets at both sides of the shattering protection element is particularly beneficial in that different alternatives for surface design of the shattering protection element are provided for achieving a good bond between the shattering protection element and the holding element or the vehicle body, respectively.

The solution by which at least two separate shattering protection elements are fixed side by side to the pane or a functional element fixed at the pane, and wherein the shattering protection elements are connected via an adhesive connection or a foamed frame to the vehicle body or to a holding element connected to the vehicle body is particularly beneficial in that, by utilizing a plurality of shattering protection elements, a particularly flexible adaptation of the shattering protection function for different fields of application or different panes is achieved.

The solution by which a shattering protection element is fixed to the pane or to a functional element fixed at the pane, and wherein the shattering protection element is connected via a sheet-like connecting element to an adhesive connection or a foamed frame, which adhesive connection or foamed frame is connected to the vehicle body or to a holding element connected to said vehicle body is particularly beneficial in that, by utilizing a sheet-like connecting element between the shattering protection element and the foamed frame or the adhesive connection, the necessity of directly connecting the shattering protection element with the support element or the vehicle body by an adhesive connection or a foamed frame can be eliminated, whereby an increase in freedom of design is achieved.

In the following, examples of the invention will be described by reference to the accompanying drawings, wherein:

BRIEF DESCRIPTION OF THE DRAWINGS

FIG. 16 is a perspective view of a modified embodiment of a pane arrangement according to the invention, partially in cross-section, wherein part of the adhesive connection has been cut away;

FIG. 17 is a view like FIG. 16, wherein a modified embodiment is shown;

DETAILED DESCRIPTION OF THE INVENTION

Figure 1:
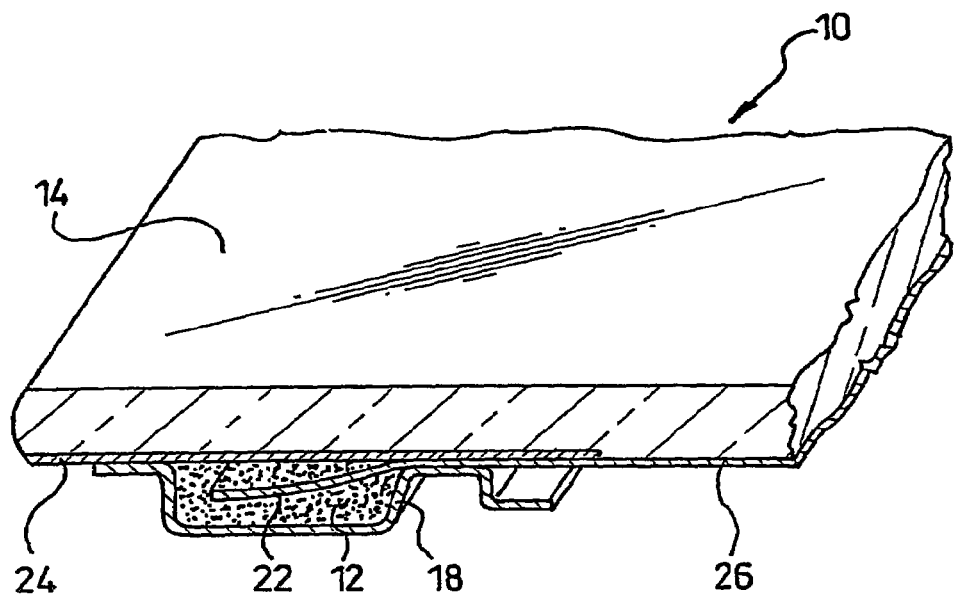
FIG. 1 is a cross-sectional view of the periphery of a first embodiment of a pane arrangement.

In FIG. 1, a first embodiment of a pane arrangement 10 is shown which could be, for example, a windshield, a side window or a roof window for a motor vehicle, or a window for ships, boats, tractors, construction vehicles, and the like. The pane arrangement 10 comprises an at least partially transparent glass pane 14 which is preferably made of thermally pre-stressed safety glass. At the side of the pane which faces the passenger compartment, the peripheral region of the pane 14 is provided with a holding element 18 which, in turn, is connected to the vehicle body. The holding element 18 may be fixedly or movably connected with the vehicle body so that, in the latter case, the entire pane arrangement 10 is movable in order to, optionally, at least partially expose the opening of the vehicle body covered by the pane arrangement 10. The peripheral region of the pane 14 is fixedly connected, at the side facing the passenger compartment, with the holding element 18 via an adhesive connection 12 and hence is likewise connected, via the holding element 18, with the vehicle body. At the side of the glass pane 14 facing the passenger compartment a glass frit 24 may be provided which may serve as a translucent or opaque blind and as an adhesive surface for covering the adhesive connection 12 and the holding element 18 from view at the outer side pane.

A protective foil composite 26 is laminated or glued onto the central transparent portion of the side of the pane 14 facing the passenger compartment, with this region extending into the region of the glass frit 24. The side of the protective foil composite 26 facing the pane 14 is provided with an adhesive foil or adhesive layer 28 serving to glue a protective foil 30, which is tearing-resistant and scratching-proof, to the pane 14. Such a layer composition is shown as an example in FIG. 5. In all embodiments, the adhesive foil 28, for example, could be a polyvinyl butyral film (PVB-film), a transparent foil made of thermoplastic polyurethane (PTU) or a foil made of ethylene vinyl acetate copolymer (EVA), while the protective foil 30 in all embodiments preferably may be a scratching-proof coated plastic foil, for example, an optical polyethylene terephtalate foil (PET-foil) coated with polysiloxanes or acrylate lacquers or a polycarbonate foil (PC-foil).

The peripheral region 22 of the protective foil composite 26 extends into the adhesive connection 12 and is at least partially embedded or is immersed within the adhesive connection 12, i.e., in this area, the protective foil composite 26 does not touch the pane 14. The peripheral region 22 and a portion of the central region of the protective foil composite 26 are located between the holding element 18 and the pane 14. In the peripheral region 22 of the protective foil composite, which does not touch the pane 14, the adhesive foil or adhesive layer 28 may be omitted.

Thus, the adhesive connection 12 not only serves to connect the holding element 18 with the pane 14, but it further serves to fixedly connect the protective foil composite 26 with the holding element 18. As a result, it can be ensured that, even upon breakage of the glass pane 14, a certain mechanical integrity of the pane arrangement is preserved, since the protective foil composite 26 remains stretched in its peripheral region via the holding element 18 which, in turn, is connected with the vehicle body, even if the pane 14 has broken. Although, in this case, the protective foil composite 26 loses its flexural strength, it remains in place relative to the holding element 18, whereby it can be prevented that, on the one hand, passengers are thrown out through the broken pane 14 and that, on the other hand, shatters of the pane or articles from outside may penetrate into the passenger compartment. In addition, in case of destruction of the glass pane 14 by vandalism, the protective foil composite 26 provides for a certain protection from burglary. The shattered pieces of the broken glass pane 14 adhere to the protective composite 26, i.e., the protective foil 30, due to the adhesive layer 28. Thereby, the protection foil 30 acts as a shattering protection foil.

Figure 5:
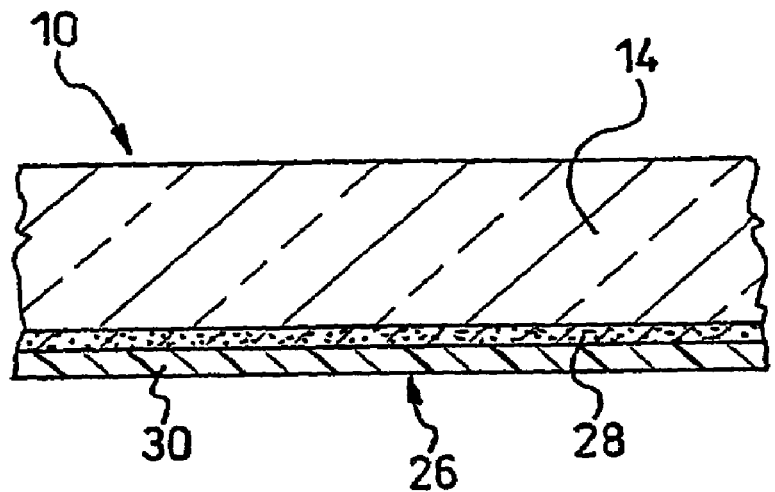
FIG. 5 is an enlarged sectional view of the layer structure of an example of a pane arrangement according to the invention outside the peripheral region.
Figure 6:
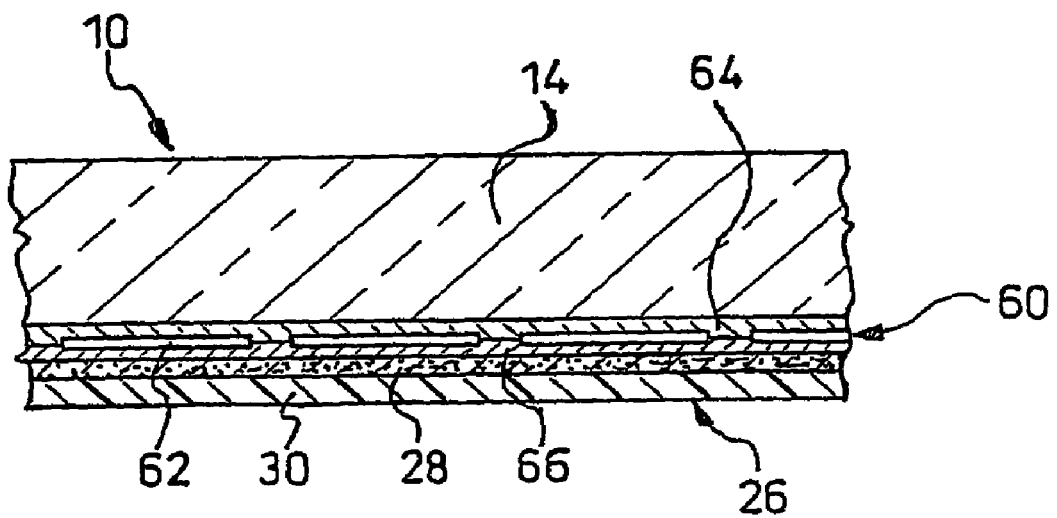
FIG. 6 is a view like FIG. 5, wherein a modified embodiment is shown.

FIG. 6 shows, as an alternative to FIG. 5, a layered structure of the pane arrangement 10 in which the protective foil composite 28 is not directly glued to the glass pane 14, but rather a solar cell foil composite 60 is provided between the pane 14 and the adhesive foil or layer 28 of the protective foil composite 26. The solar cell foil composite 60 comprises a plurality of solar cells 62 which are electrically connected to each other and which are embedded between two adhesive melting foils 64, 66 that are preferably made of EVA. The melting adhesive foil 64 serves to connect the solar cell foil composite 60 with the glass pane 14, while the melting adhesive foil 66 serves to connect the protective foil composite 26 with the solar cell foil composite 60, and hence with the glass pane 14.

Optionally, the melting adhesive foil 66 may be omitted, in which case the adhesive foil 28 serves to directly connect the shattering protection foil 30 with the solar cells 63 and the melting adhesive foil 64, respectively.

Preferably, the solar cell foil composite 60 does not extend into the peripheral region 22 of the protective foil composite 26.

Figure 2:
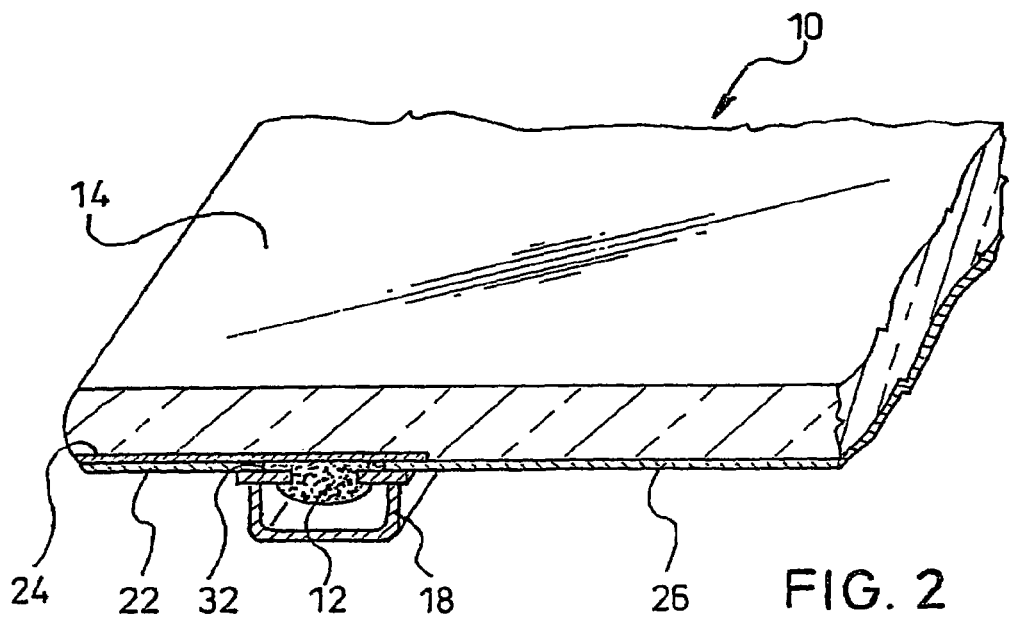
FIG. 2 is a view like FIG. 1, wherein a second embodiment is shown.

In FIG. 2, a modified embodiment of the pane arrangement 10 of FIG. 1 is shown, wherein, in contrast to FIG. 1, not only the central region but also the peripheral region 22 of the protective foil composite 26 is glued to the pane 14, i.e., in this case, the adhesive connection between the pane 14 and the protective foil composite 26 extends over the entire surface of the protective foil composite 26. As used herein, a shattering protection foil 30, fixed at the pane 14 over its entire surface, is meant to be an arrangement in which the shattering protection foil 30 and the foil composite 26, respectively, is glued to the pane over its entire surface. In order to, nevertheless, achieve an adhesive bond of the holding element 18 with the pane 14, the peripheral region 22 of the protective foil composite 26 is provided with holes 32 through which the adhesive connection 12 extends to the pane 14 for achieving a fixed connection between the pane 14 and the holding element 18. The protective foil composite 26 is located between the pane 14 and the holding element 18 so that also an adhesive bond between the protective foil composite 26 and the holding element 18 is achieved via the holes 32. In this manner, manufacturing of the pane arrangement 10 can be made particularly simple by applying the protective foil composite 26 over its entire surface to the pane 14, while nevertheless a direct adhesive connection 12 is provided between the pane 14 and the holding element 18.

The central region of the protective foil composite 26 may be fixed directly at the pane 14, as shown in the embodiment of FIG. 1, or it may be fixed at the pane 14 via an intermediate solar cell foil composite 60, see FIGS. 5 & 6, respectively. In both embodiments, the holding element 18, for example, could be a reinforcing frame or a support frame, or if the pane arrangement 10 is a glass panel of a vehicle roof, it could be a so-called inner panel frame.

In both embodiments, the adhesive connection 12 is preferably produced by applying an adhesive band to one of the elements to be glued together and by subsequently putting or pressing together the two elements. The adhesive connection 12 is, in contrast to, for example, a foamed frame, permanently elastic and has preferably a Shore A hardness between 30 and 70 (German industrial standard DIN 53505), a tensile strength (German industrial standard DIN 53504) from 1 to 10 N/mm$^2$ and an elongation at tear (German industrial standard DIN 53504) from 300-600%. The adhesive material may be, for example, a silicone material or a PU-based material.

Figure 3:
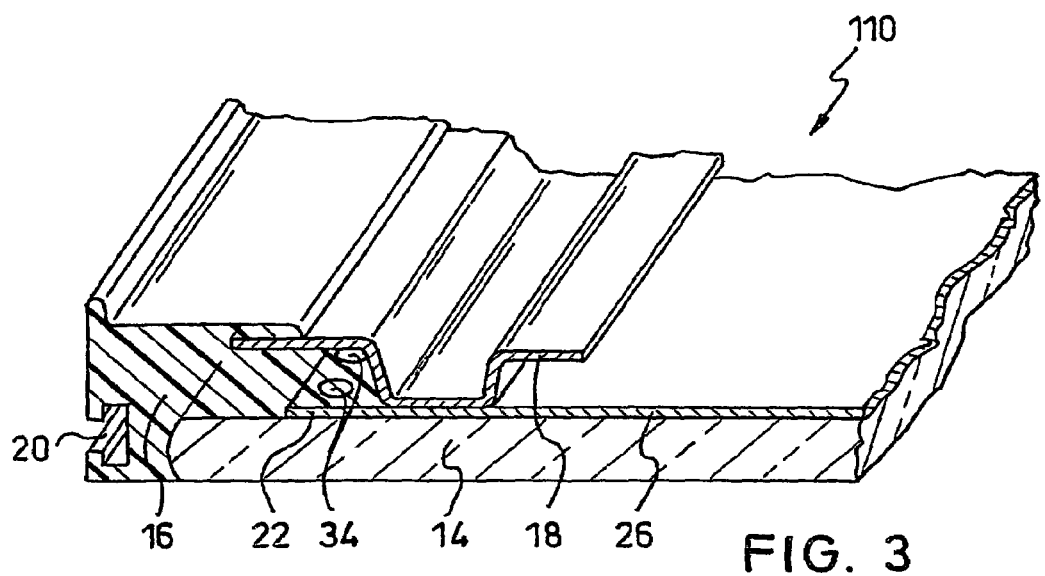
FIG. 3 is a view like FIG. 1, wherein a third embodiment is shown.

FIG. 3 shows an embodiment of a pane arrangement 110 which is a glass panel for a vehicle roof having a foamed frame. In FIG. 3, the lower side of the panel is shown facing up. An essential difference of the embodiment of FIG. 3 relative to the embodiments of FIGS. 1 & 2 is the fact that the adhesive connection 12 has been replaced by a foamed frame 16 which surrounds the glass pane 14 at its outer edge and at the lower side of the periphery of the pane and which, similar to the adhesive connection 12, on the one hand, the frame 16 serves to fixedly connect an inner panel frame 18 with the pane 14, and on the other hand, it serves to fixedly connect the protective foil composite 26 with the inner panel frame 18. In addition, the foamed frame 16 comprises a receptacle 20 into which an edge seal (not shown) can be inserted surrounding the foamed frame 16, the seal serving to prevent, when the roof panel 110 has been closed, penetration of moisture into the passenger compartment. The material of the foamed frame 16 could be, for example, a polyurethane foam. The foam molding process is carried out within an appropriate tool into which the inner panel frame and the pane 14 with the protective foil composite 26 are laid. In contrast to an adhesive connection the foamed frame is hard, i.e., it is not permanently elastic.

Similar to the embodiment of FIG. 2, the protective foil composite 26 is glued to the pane 14 over its entire surface, i.e., also in its peripheral region 22. For achieving particularly good bond of the protective foil composite 26 with the foamed frame 16, and hence with the inner panel frame 18, the peripheral region 22 of the protective foil composite 26 is provided with holes 34 into which foam material penetrates during the foam moulding process.

The inner panel frame 18 serves as a support arrangement or holding element for the glass pane 14 in order to connect the glass pane 14 to the vehicle body via an displacement mechanism (not shown).

The layer structure of the central region of the protective foil composite 26 may be similar to that shown in FIG. 5 or 6, i.e., with or without an intermediate solar cell foil composite 60.

In addition, similar to the embodiments shown in FIGS. 1 & 2, a glass frit (not shown in FIG. 3) may be provided for covering the area of the foamed frame 16 and the inner panel frame 18 from outside.

Figure 4:
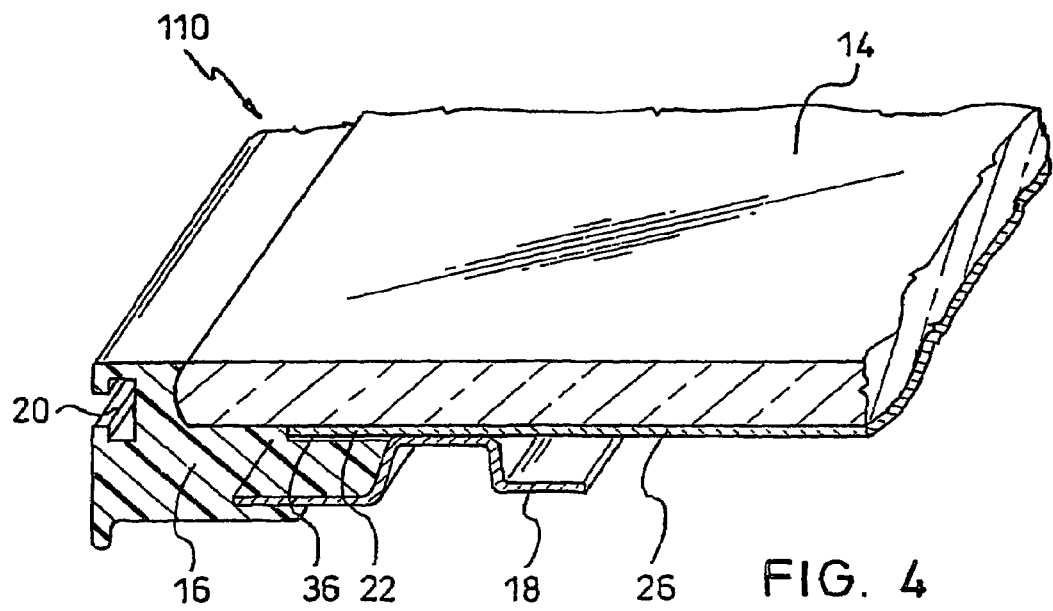
FIG. 4 is a view like FIG. 1, wherein a fourth embodiment is shown.

FIG. 4 shows a modification of the embodiment of FIG. 3, wherein an improved bond between the peripheral region 22 of the protective foil composite 26 and the inner panel frame 18 is not achieved by providing holes 34, but is rather achieved by special treatment of the surface 36 of the peripheral region 22 of the protective foil composite 26. For example, the surface of the surface area 36 may be mechanically roughened or it can be provided with a primer system in order to produce an appropriate bonding bridge between the protective foil composite 26 and the foamed frame 16.

The above-mentioned measures for improving bond between the protective foil composite 26 and the foamed frame 16 and the adhesive connection 12, respectively, also may be applied in combination. Apart from the different design of the bonding bridge, the glass frit and the variants of the layer structure of the embodiments of FIGS. 1 to 3 also apply here. In general, it is possible also for the embodiment of FIG. 1 to provide the peripheral region 22 of the protective foil composite 26 with holes or with a surface treatment according to FIG. 4 in order to achieve improved bond between the protective foil composite 26 and the adhesive connection 12.

For the embodiment of FIG. 4, a modification is possible wherein the adhesive connection between the protective foil composite 26 and the pane 14 does not extend into the peripheral region 22 so that the peripheral region 22, similar to the embodiment of FIG. 1, is free from the pane 14 and may be embedded within the foamed frame 16.

The adhesive connection between the shattering protection foil 30 and the pane 14 (or the solar cell foil composite 60) may be achieved, rather than by an adhesive foil 28, by applying adhesive material onto the pane over the entire surface and by subsequently applying the shattering protection foil 30 and pressing it to the pane.

Figure 7:
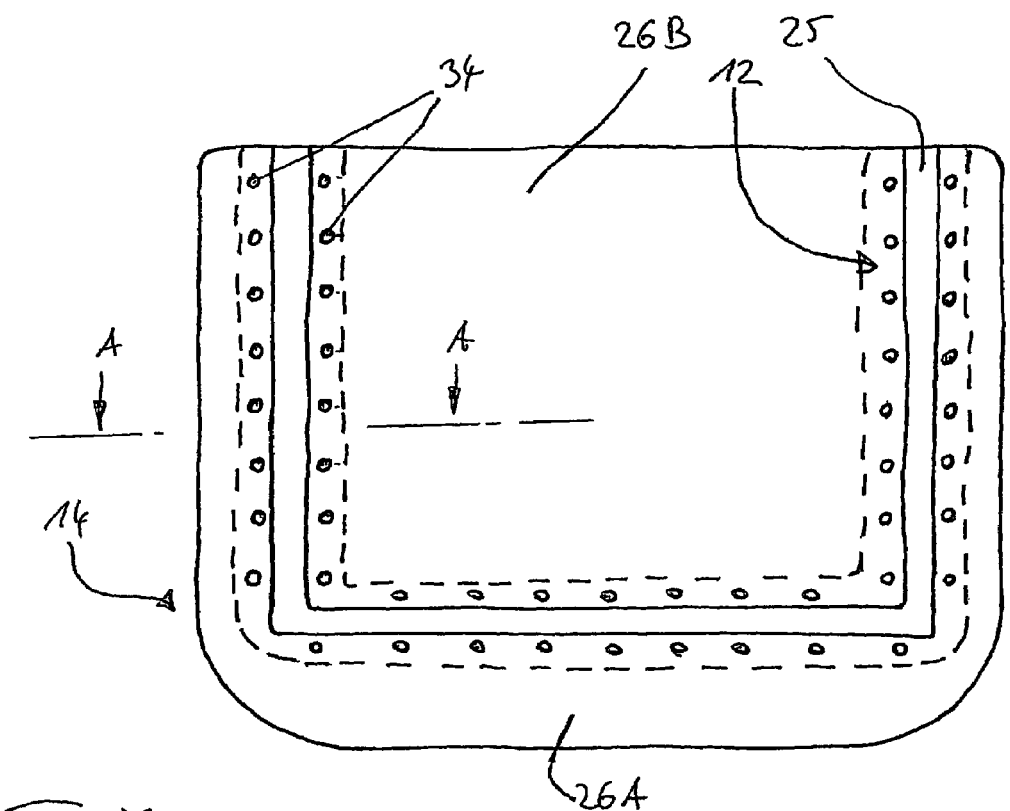
FIG. 7 is a schematic elevated view of a pane arrangement according to the invention comprising two separate shattering protection elements.
Figure 8:
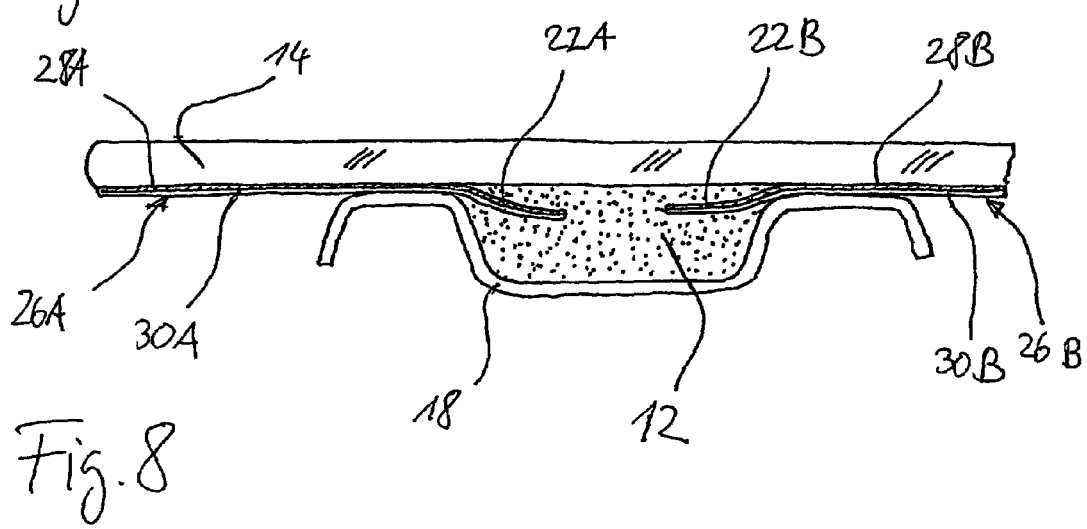
FIG. 8 is a cross-sectional view of the left-hand peripheral region of the pane arrangement of FIG. 7 along the line A-A of FIG. 7.

In FIGS. 7 & 8, an embodiment is shown wherein, in contrast to the embodiments discussed so far, not a single, but rather two protective foil composites 26A, 26B are provided which are separated by a gap 25 and which each comprise an adhesive foil 28A, 28B, respectively, and a shattering protection foil 30A, 30B, respectively. The two foil composites 26A, 26B are arranged adjacent to each other, wherein the foil composite 26B is located inwardly relative to the centre of the pane, while the protective foil composite 26A surrounds the foil composite 26B—separated by a gap 25—in a ring-like manner. Both foil composites 26A, 26B are provided with holes 34 in their peripheral region facing the gap 25 for improving bond within a common adhesive connection 12, by which also a holding element 18 is glued to the lower side of the pane. According to FIG. 8, the respective peripheral regions 22A, 22B, respectively, facing the gap 25 are free with regard to the lower side of the glass pane 14, i.e., they freely project into the adhesive connection 12. In FIG. 7, the common adhesive connection 12 of the foil composites 26A, 26B is indicated by dashed lines.

As an alternative, a corresponding foamed frame could be provided for fixing the holding element 18, rather than using an adhesive connection 12.

Figure 18:
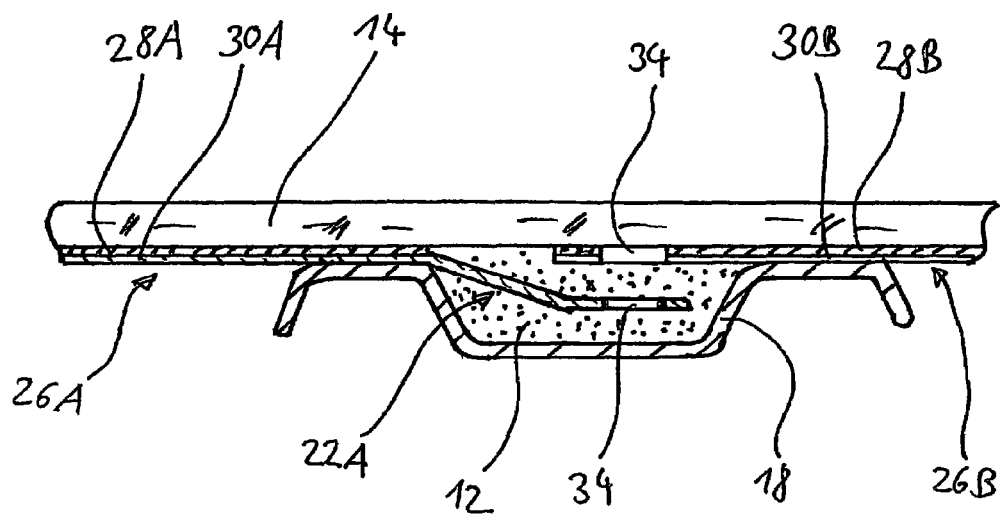
FIG. 18 is a view like FIG. 8, wherein a modified embodiment is shown.
Figure 19:
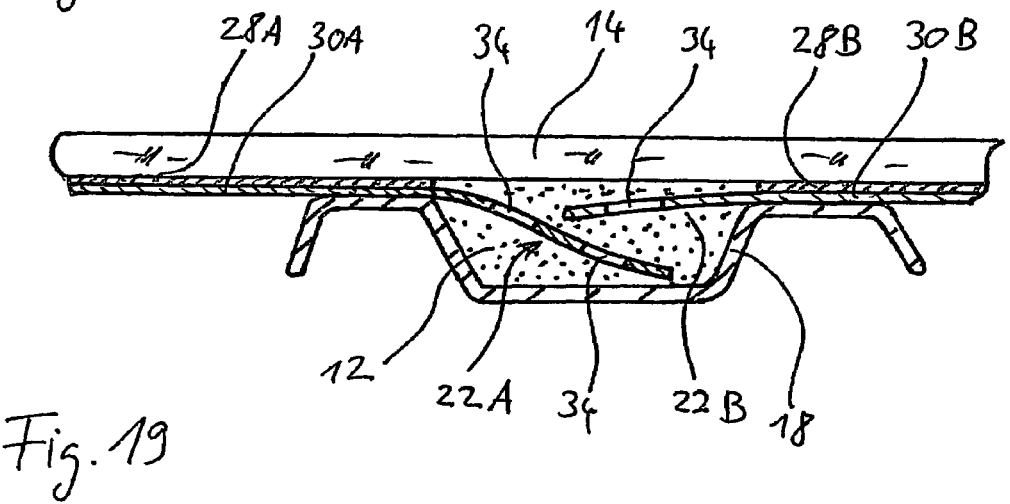
FIG. 19 likewise is a view like FIG. 8 wherein a further modified embodiment is shown.

FIGS. 18 & 19 each show a modification of the embodiment of FIG. 8, wherein the two shattering protection foils 30A, 30B, in both cases, overlap in the region of the common adhesive connection 12 or are vertically shifted to each other in part, i.e., in this case, in contrast to the embodiment of FIGS. 7 & 8, there is no horizontally extending gap 25, but rather the separation occurs in the vertical direction.

In the embodiment of FIG. 18, the right-hand shattering protection foil 30B is fixed at the pane 14 over its entire surface via the melting adhesive foil, wherein in the region of the foils 28, 30, extending into the adhesive connection 12, holes 34 are provided for penetration of the adhesive material to the pane 14, while the left-hand shattering protection foil 30A has a peripheral region 22A which extends into the adhesive connection 12 and which is free from the pane 14 and which projects laterally, wherein likewise holes 34 are provided for improved anchoring.

In the embodiment of FIG. 19, for both shattering protection foils 30A, 30B, the peripheral region 22A, 22B which extends into the adhesive connection 12 is free from the pane 14 and projects laterally. Also here, both peripheral regions 22A, 22B are provided with holes for improved anchoring within the adhesive connection 12.

In both embodiments, the peripheral regions of the shattering protection foils 30A, 30B, which are free from the pane 14, are not provided with the melting adhesive foil 28A, 28B.

Figure 9:
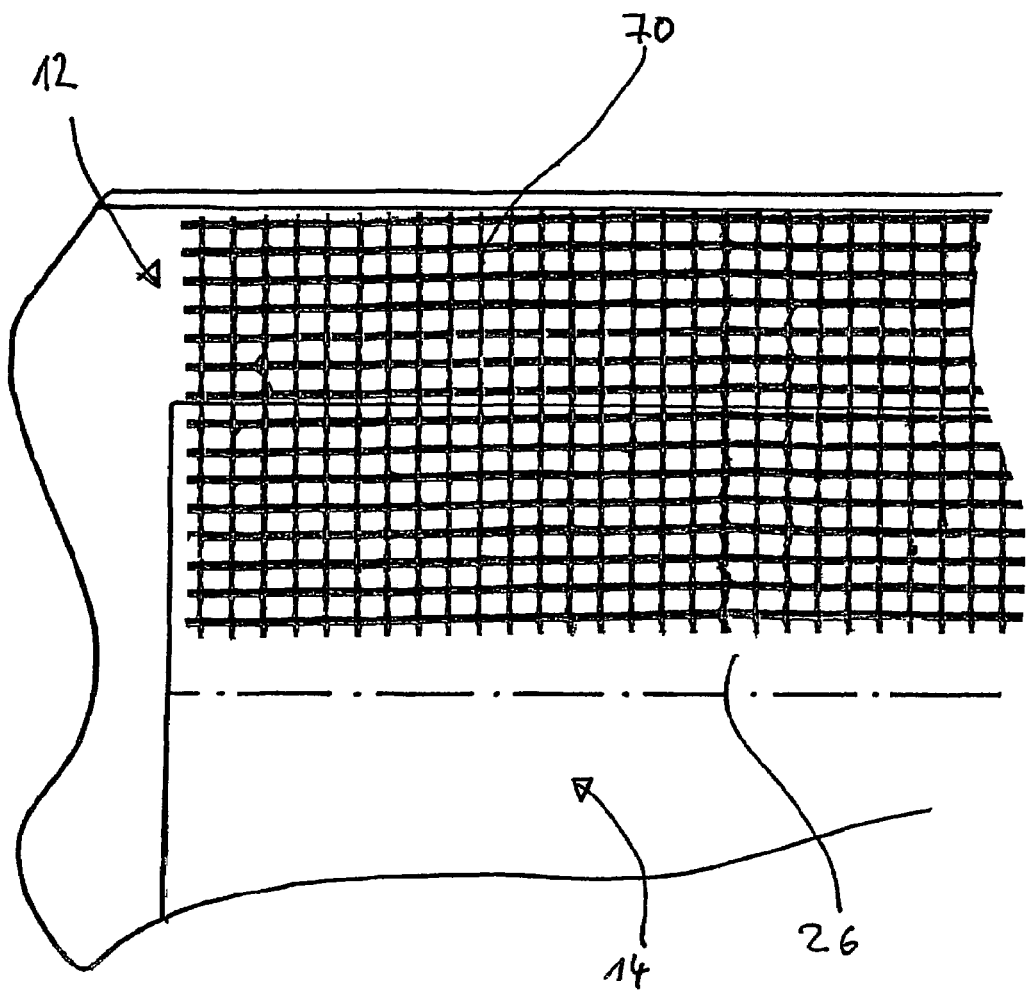
FIG. 9 is a schematic elevated view of a part of a modified embodiment of a pane arrangement according to the invention.
Figure 10:
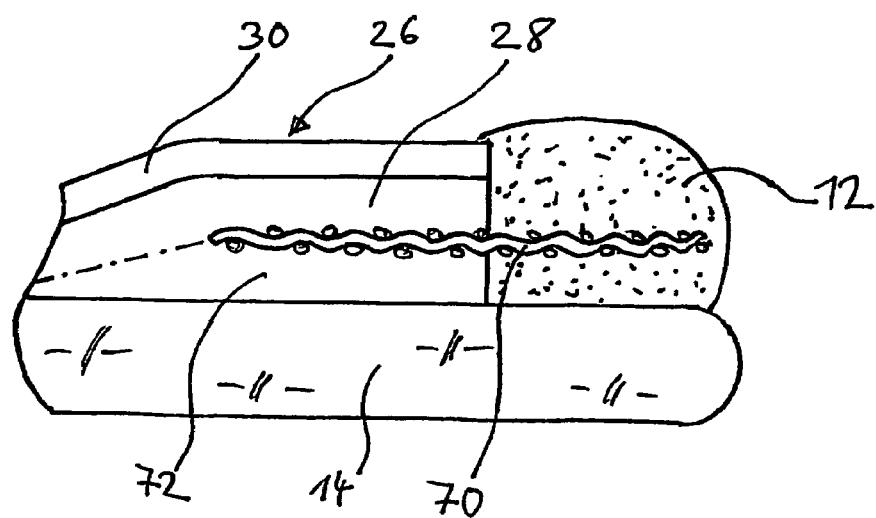
FIG. 10 is a sectional view along the line B-B of FIG. 9.

In FIGS. 9 & 10, a modified embodiment of a pane arrangement is shown, wherein the bond of the protective foil composite 26 to the adhesive connection of the holding element 18 is not a direct one, but rather is achieved via a sheet-like connecting element 70. In this case, the bond between the protective foil composite 26 and the adhesive connection 12, which is connected with a holding element (not shown in FIGS. 9 & 10) is not achieved via direct contact between the protective foil composite 26 and the adhesive connection 12, but rather is achieved indirectly via the connecting element 70 which serves as a bonding bridge. In the embodiment, shown in FIGS. 9 & 10, the connecting element 70 is formed as a strip, wherein the half facing the center of the pane 14 is sandwiched in the peripheral region of the pane 14 between the melting adhesive foil 28 provided at the top of the shattering protection foil 30 and an additional strip 72 of melting adhesive foil which rests on the lower side of the pane 14. The half of the connecting element 70 facing the edge of the pane, however, projects into the adhesive connection 12. The adhesive connection 12 could be replaced by a foamed frame.

The connecting element 70 has a sheet-like design and is preferably made of a fabric made of, for example, plastic or metal, with the mesh size being selected according to the viscosity of the adhesive material or the foam material of the adhesive connection 12 or the foamed frame, respectively, for enabling the adhesive material or foam material to penetrate through the pores of the fabric. The connecting element 70 may be provided throughout the entire peripheral region of the foil composite 26 or only in portions thereof.

Figure 11:
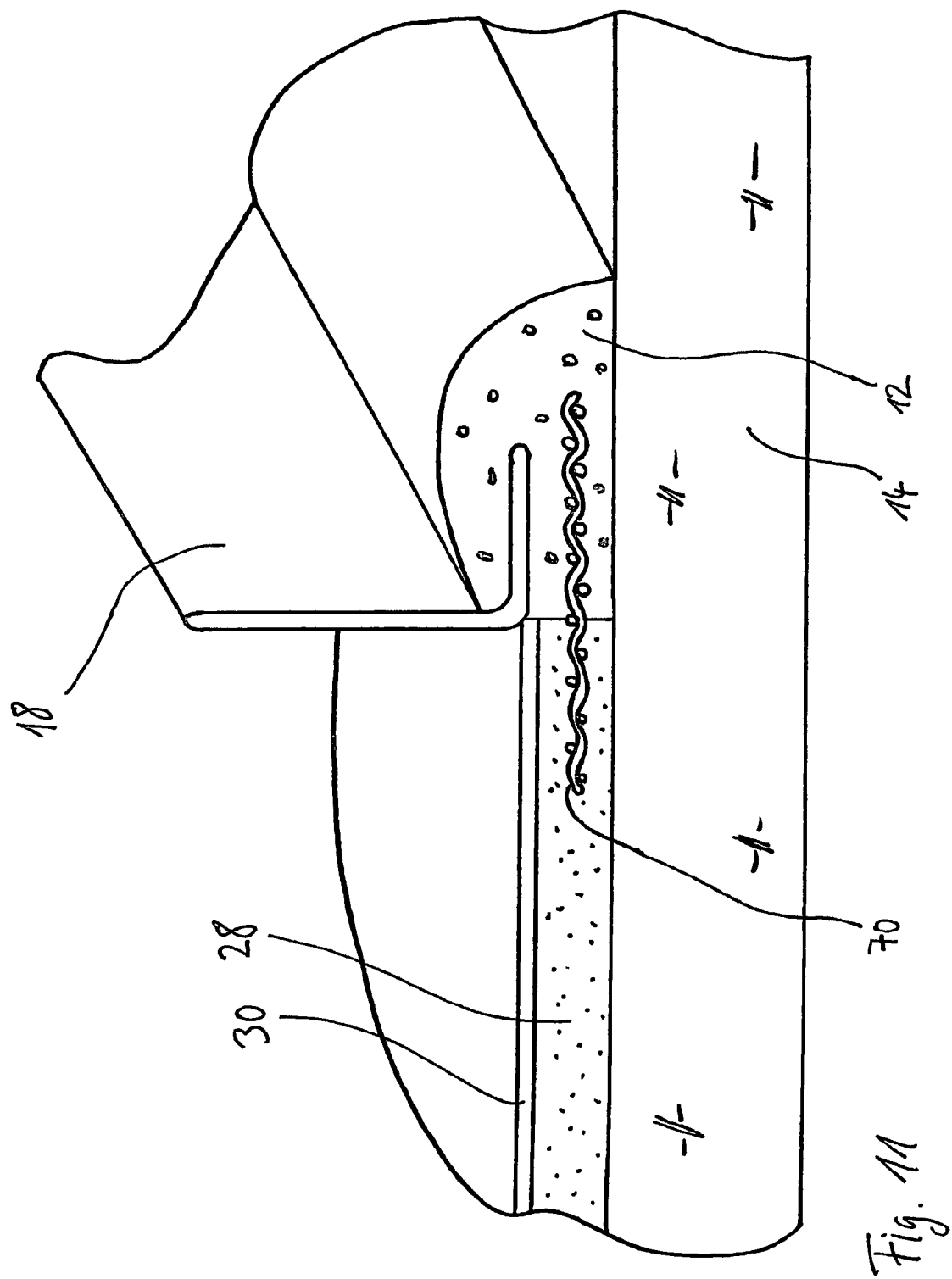
FIG. 11 is a perspective view, partially shown in cross-section, of a part of a pane arrangement comprising a connecting element, wherein the underside of the pane arrangement is shown on top in FIG. 11.

In FIG. 11, a modification of the embodiment of FIGS. 9 & 10 is shown wherein a holding element 18, designed as an angle, is illustrated which is embedded together with the connecting element or connecting fabric 70 within the adhesive band 12 and which is thereby connected to the lower side of the pane 14. The holding element 18 serves to bond the pane 14 to the vehicle body.

Figure 12:
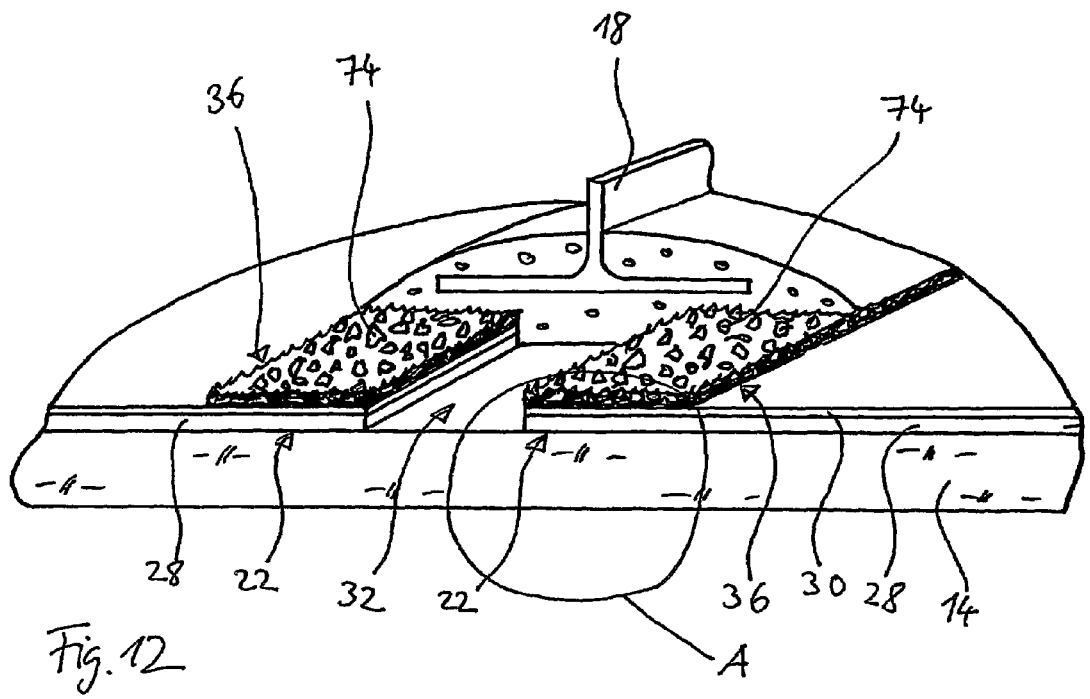
FIG. 12 is a view similar to FIG. 11 wherein a modified embodiment is shown partially cut-away.
Figure 13:
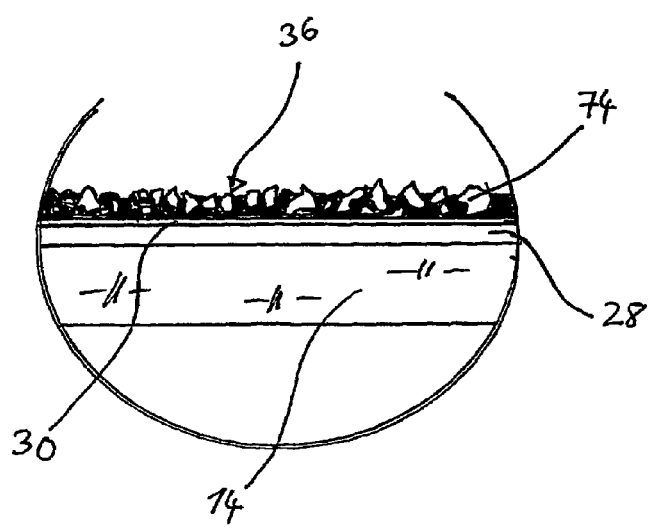
FIG. 13 is an enlarged view of the front edge of the region labeled with "A" in FIG. 12.

FIGS. 12 & 13 show a modification of the embodiment of FIG. 4, wherein the surface of the peripheral region 22 of the shattering protection foil 30 is provided with a primer system 36 for improving the adhesion with an adhesive connection 12 or a foamed frame. The essential modification regarding the embodiment of FIG. 4 is the enrichment of the surface of the primer system 36 facing away from the shattering protection foil 30 with filling particles 74 in order to further improve the bond between the peripheral region 22 of the shattering protection foil 30 and the adhesive connection 12 or the foamed frame. The filling particles 24 may be, for example, quartz sand or plastic particles (plastic chips), with the average particle size preferably being from 0.1-1.0 mm.

In addition, in the embodiment of FIG. 12, the peripheral region 22 of the shattering protection foil 30 comprising the primer system 36 is provided with a recess 32 through which the adhesive connection 12 or the foamed frame may have direct contact with the lower side of the pane 14. A similar recess is also shown in the embodiment of FIG. 2. In general, analogous to the embodiment of FIGS. 7 & 8, the recess 32 could surround part of the shattering protection foil 30, whereby two separate shattering protection foils could be fixed to a holding element 18 via a single adhesive connection or foamed frame, wherein this holding element 18, according to the embodiment of FIG. 12, has a T-shaped cross-sectional profile and wherein the horizontal portion of the holding element 18 is embedded within the adhesive connection 12 or the foamed frame in order to achieve good anchoring within the adhesive connection 12 or the foamed frame.

Figure 14A:
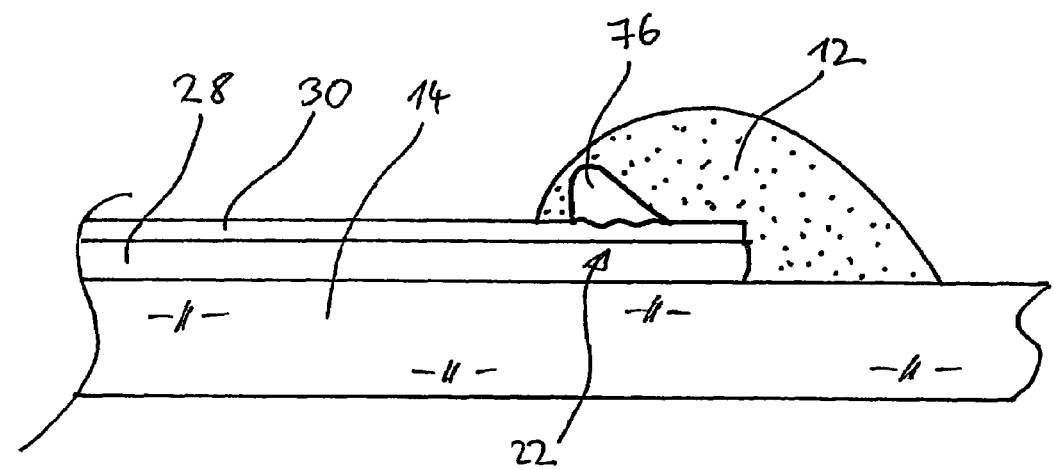
FIG. 14a to FIG. 14c show different embodiments of a pane arrangement according to the invention in a cross-sectional view, wherein all embodiments relate to an attachment of the shattering protection element at the pane over the entire area of the shattering protection element and wherein the underside of the pane arrangement is shown on top.
Figure 14B:
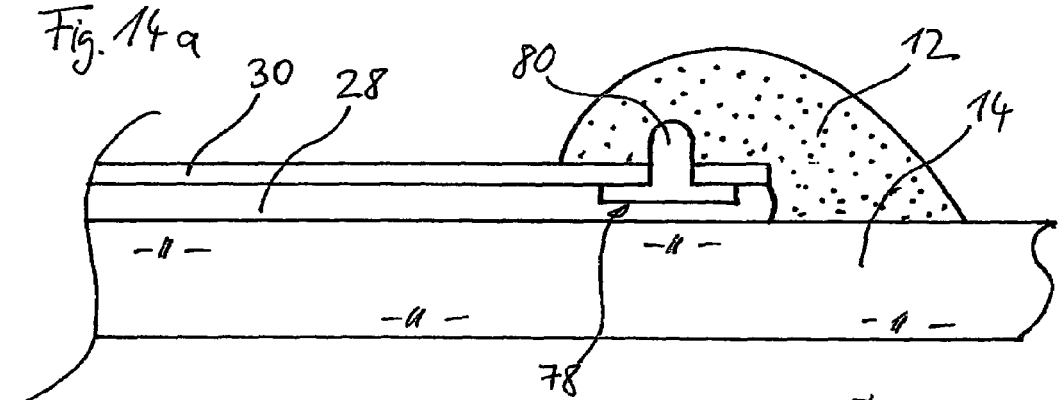
Figure 14C:
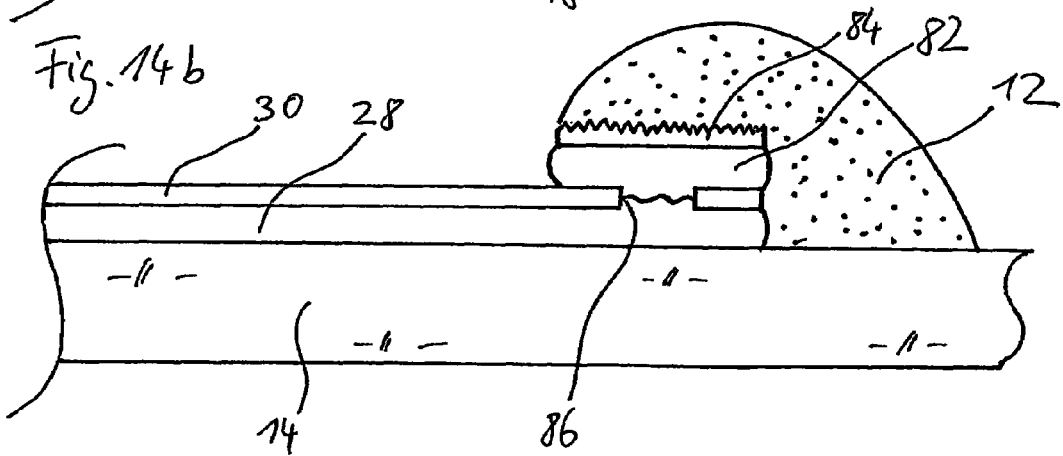

FIGS. 14*a* to 14*c* show different variants for achieving improved bonding within an adhesive connection 12 or a foamed frame by modification of a surface of the peripheral region 22 of the shattering protection foil 30 facing away from the pane 14, in case of a shattering protection foil 30 which is fixed by adhesion over its entire surface.

In the embodiment of FIG. 14*a*, a plastic profile 76 is welded onto the surface of the peripheral region 22 of the shattering protection foil 30 facing away from the pane 14, with the plastic profile 76 being embedded within the adhesive connection 12 or the foamed frame in order to prevent, as far as possible, the foil from being torn out of the adhesive connection 12 or the foamed frame. The plastic profile 76 extends downwardly into the adhesive connection 12 or the foamed frame. In a modified embodiment, the plastic profile 76 may be replaced by a plurality of separate elements having a similar shape which likewise are welded onto the shattering protection foil 30. According to a further modification of the embodiment of FIG. 14*a*, the profile 76 may be glued onto the surface of the shattering protection foil 30 rather than being welded thereto.

FIG. 14*b* shows a modified embodiment wherein a plastic profile 78 is provided in the peripheral region 22 of the shattering protection foil, which profile has been inserted between the shattering protection foil 30 and the melting adhesive foil 28 or a corresponding adhesive layer. This profile 78 comprises a plurality of projections 80 which extend through corresponding perforations of the foil 30 into the adhesive connection 12 or the foamed frame in order to achieve improved bond of the shattering protection foil 30 within the adhesive connection 12 or the foamed frame. Also, in this case, a plurality of similar separate elements could be used rather than a single one-piece profile.

The embodiments of FIGS. 14*a* & 14*b* have the common feature that the peripheral region 22 of the shattering protection foil 30 has been provided with a respective projecting structure 76, 80, for improving the bond of the shattering protection foil 30 to the adhesive connection 12 or the foamed frame.

According to the embodiment of FIG. 14*c*, improvement of the bond of the shattering protection foil 30 to the adhesive connection 12 or the foamed frame is achieved by gluing a sheet-like structure 84 having a roughened surface onto the surface of the shattering protection foil 30 facing away from the pane 14 via a strip 82 of an melting adhesive foil. The structure 84 may be, for example, a strip of fabric with particles glued onto the strip of fabric and wherein the roughened structure 84 is embedded within the adhesive connection 12 or the foamed frame. In order to achieve, additionally, a direct bond of the melting adhesive foil strip 82 to the melting adhesive foil 28—and thus, to the lower side of the pane 14—the shattering protection foil 30 may be provided with an opening 86 through which contact between the melting adhesive foil strip 82 and the melting adhesive foil 28 is achieved.

Figure 15A:
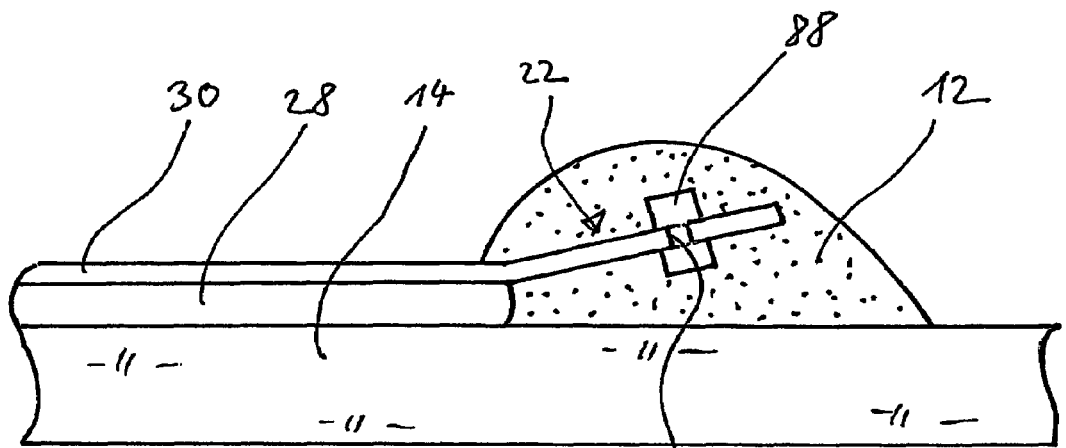
FIG. 15a to 15c are views like FIG. 14a to 14c, wherein modified embodiments are shown in which the periphery of the shattering protection element projects into the adhesive connection.
Figure 15B:
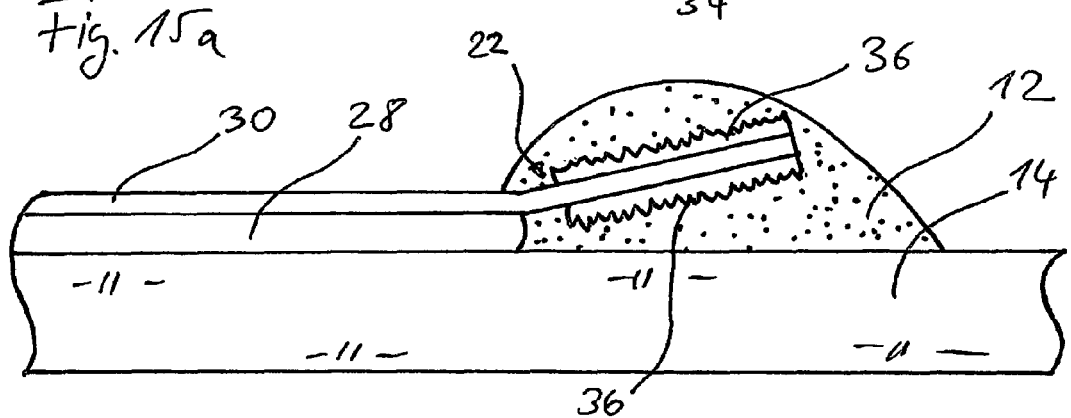
Figure 15C:
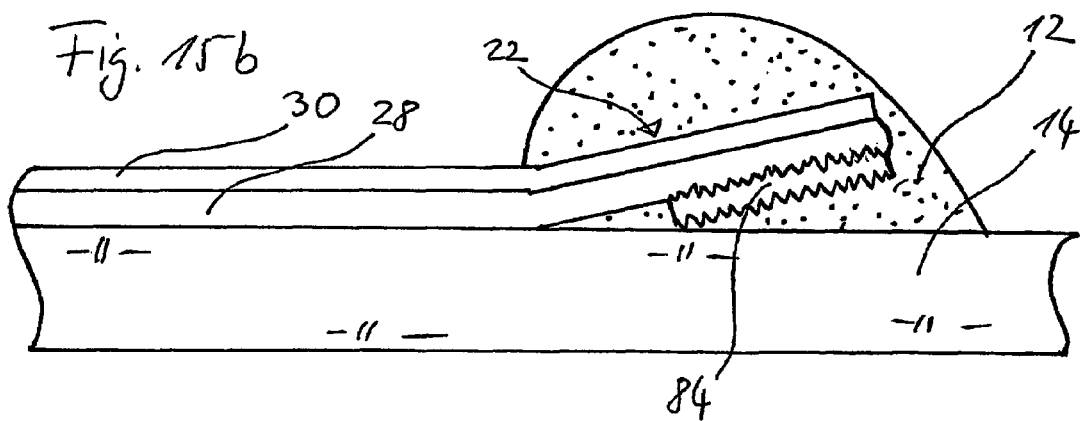

FIGS. 15*a* to 15*c* show embodiments wherein the peripheral region 22 of the shattering protection foil 30 is free from the pane 14 and extends into an adhesive connection 12, with different options for improving adhesion of the shattering protection foil 30 within the adhesive connection 12 being shown.

According to the embodiment of FIG. 15*a*, the peripheral region 22 of the shattering protection foil 30 is provided with holes 34 through which elements 88 penetrate which project above the respective surface of the shattering protection foil 30 on both sides and extend into the adhesive connection 12. Thereby, the fixation of the shattering protection foil 30 at the adhesive connection 12 can be improved significantly. The free peripheral region 22 of the shattering protection foil 30, which extends into the adhesive connection 12, is not provided with a melting adhesive foil 28.

The embodiment of FIG. 15*b* shows an alternative modification of the surface of the peripheral region 22 of the shattering protection foil 30, wherein both surfaces of the peripheral region 22 of the shattering protection foil 30 are provided with a primer system 36 comprising filling particles, for example, quartz sand particles or plastic particles, at the side facing the adhesive connection 12. Also in the embodiment of FIG. 15*b* the peripheral region 22 of the shattering protection foil 30 is not provided with a melting adhesive foil 28.

However, according to the embodiment of 15*c*, also the melting adhesive foil 28 extends into the peripheral region 22 of the shattering protection foil 30 and serves to connect a sheet-like structure 84 having a roughened surface to the side of the shattering protection foil 30 facing the pane 14 in order to improve bond of the shattering protection foil 30 within the adhesive connection 12 by engagement of the roughened structure 84 with the adhesive connection 12.

FIG. 16 shows a variant of the embodiment of FIG. 15*a*, wherein plastic cones 90 are welded onto the surface of the peripheral region 22 of the shattering protection foil 30 facing away from the pane 14 replace the elements 88 that penetrate through the holes 34. The cones 90 engage within the adhesive connection 12, thus improving bonding of the shattering protection foil 30 within the adhesive connection 12.

FIG. 17 shows a further modification of the embodiments of FIGS. 15a to 15c and FIG. 16, wherein the peripheral region 22 of the shattering protection foil 30 is provided with holes 34 which are located one behind the other along the adhesive connection 12 and through which an elongated structure 92, which preferably may be a thread or a cord, is passed in an alternating manner, whereby the structure 92 forms eyelets 94 at both sides of the shattering protection foil 30. Preferably, the elongated structure 92 is made of plastic material. A plurality of such structures 92 could be provided side by side. The structure 92 extends within the adhesive connection 12 and thereby is in engagement with the adhesive connection 12 in such a manner that the bond of the shattering protection foil 30 within the adhesive connection 12 is improved.

Generally, in all embodiments described, the shattering protection element may be formed by a shattering protection plate rather than by a shattering protection foil, with these two variants being distinguished essentially with regard to the bending elasticity—and hence, for a given material, with regard to the thickness—of the shattering protection element.

Further, the adhesive connection or foamed frame generally may serve to directly connect the shattering protection element to the vehicle body rather than to connect the shattering protection element to a holding element connected to the vehicle body. It is to be understood that, in all embodiments shown, the adhesive connection or the foamed frame is connected to the vehicle body or to a holding element connected to the vehicle body, even if this is not shown in all figures.

In all embodiments shown, the adhesive connection or the foamed frame, at the same time, serves both for connecting the shattering protection element to a holding element (or to the vehicle body) and for connecting the pane to the holding element (or the vehicle body). However, generally, also embodiments are possible in which the adhesive connection or the foamed frame exclusively serves to connect the shattering protection element with a holding element or with the vehicle body so that, in this case, the pane is either connected separately with the holding element or the vehicle body, or is connected indirectly to the holding element or the vehicle body via the connection of the shattering protection element.

Although, in most of the embodiments shown, only a single shattering protection element is shown, in general, a plurality of shattering protection elements for the pane could be provided which are arranged side by side in a sheet-like manner.

In general, the shattering protection element may be connected to the holding element or the vehicle body via the adhesive connection or the foamed frame in the peripheral region of the shattering element and the pane (in most cases, this will be the most appropriate solution). Alternatively, the shattering protection element may be connected with the holding element or the vehicle body in a more central portion of the pane and/or of the shattering protection element.

Herein, the term "foamed frame" is to be understood such that a foamed material is applied to a surface, wherein the foamed material does not necessarily have to surround the peripheral edge of this surface. Thus, the term "foamed frame" or "surrounding by a foamed frame" herein also should cover cases which the one skilled in the art may designate as "added foamed structure" or "adding a foamed structure," respectively.

Generally, the shattering protection element may be bonded to the adhesive connection or the foamed frame either over the entire peripheral region of the shattering protection element or only within segments of the peripheral region.

In order to achieve an improved optical appearance of the shattering protection element with regard to the passenger compartment, the shattering protection element, for example, may be provided with a defined non-smooth surface structure, wherein such a "granulated" structure, for example, may be produced by action of a mold. Such granulated surface structures are used, for example, also for the surfaces of dashboards and are formed by a regular pattern of indentations. Alternatively, the shattering protection element may be provided with a printed regular pattern or may be coloured over its entire thickness. The print can be designed such that certain portions of the solar cell foil composite, for example, the solar cell connectors, are covered.

The shattering protection element preferably is located at the side of the pane facing the passenger compartment, although, under certain circumstances, it cold be desirable to provide the shattering protection element at the outer side of the pane or both at the outer side and the inner side of the pane.

Preferably, both the pane and the shattering protection element are at least partially transparent. However, also applications are possible wherein the pane and/or the shattering protection element are not transparent. In particular, if a solar cell foil composite is provided, it might be appropriate that the shattering protection element is at least partially opaque or only translucent, while the pane is transparent.

What is claimed is:

1. Arrangement for closing an opening of a vehicle, comprising a pane, wherein a shattering protection element is fixed to one of said pane and a functional element fixed at said pane, wherein said pane and said shattering protection element are connected via a permanently elastic adhesive connection to one of said vehicle body and a holding element connected to said vehicle body; and wherein the shattering protection element is a protective foil composite, an end portion of which is immersed in the adhesive connection with the immersed end portion being out of contact with the pane at a location below the pane and inward from a peripheral edge of the pane.

2. Arrangement for closing an opening of a vehicle, comprising a pane, wherein a shattering protection element is fixed over its entire surface to one of said pane and a functional element fixed at said pane, wherein said shattering protection element is connected via a permanently elastic adhesive connection to a vehicle body or to a holding element connected to said vehicle body, wherein said shattering protection element is provided with means for increasing the strength of the connection between said shattering protection element and the adhesive connection, and wherein the shattering protection element is a protective foil composite, an end portion of which is immersed in the adhesive connection with the immersed end portion being out of contact with the pane at a location below the pane and inward from a peripheral edge of the pane.

3. Arrangement for closing an opening of a vehicle, comprising a pane, wherein a shattering protection element is fixed at one of said pane and a functional element, wherein said shattering protection element is connected via a permanently elastic adhesive connection to a holding element connected to a vehicle body, and wherein said a surface of said shattering protection element is provided with means for increasing the strength of the connection between said shattering protection element and the adhesive connection, and wherein the shattering protection element is a protective foil composite, an end portion of which is immersed in the adhesive connection with the immersed end portion being out of contact with the pane at a location below the pane and inward from a peripheral edge of the pane.

4. Arrangement according to claim 1, wherein said permanently elastic adhesive connection is provided within a peripheral region of said shattering protection element.

5. Arrangement according to claim 2, wherein said means for increasing the strength of the connection are provided within a peripheral region of said shattering protection element.

6. Arrangement according to claim 2, wherein said means for increasing the strength of the connection are holes provided within said shattering protection element for enabling penetration of said adhesive connection or said foamed frame through said shattering protection element.

7. Arrangement according to claim 2, wherein said means for increasing the strength of the connection is a mechanically roughened surface portion of said shattering protection element.

8. Arrangement according to claim 2, wherein said means for increasing the strength of the connection is an elevated structure at said surface of said shattering protection element facing away from said pane.

9. Arrangement according to claim 8, wherein said elevated structure is welded or glued onto said surface of said shattering protection element and passed through openings from said side of said shattering protection element facing said pane.

10. Arrangement according to claim 8, wherein said elevated structure is formed by one of a profile projecting into the adhesive connection and by elements projecting separately into the adhesive connection.

11. Arrangement according to claim 10, wherein said elevated structure comprises one of projections and cones which extend into the adhesive connection.

12. Arrangement according to claim 2, wherein said means for increasing the strength of the connection is a structure which has a roughened surface and which has been applied to a surface of said shattering protection element facing away from said pane.

13. Arrangement according to claim 12, wherein said structure having said roughened surface has been glued onto said shattering protection element via a melting adhesive foil.

14. Arrangement according to claim 2, wherein said means for increasing the strength of the connection is a primer system applied to said surface of said shattering protection element.

15. Arrangement according to claim 14, wherein said primer system is enriched by filling particles at a side of said primer system facing away from said shattering protection element.

16. Arrangement according to claim 15, wherein said filling particles are one of quartz sand and plastic particles.

17. Arrangement according to claim 15, wherein said filling particles have an average particle size of 0.1 to 1.0 mm.

18. Arrangement according to claim 2, wherein said shattering protection element is provided with recesses and wherein said one of the adhesive connection and said foamed frame penetrate through said recesses towards said one of the pane functional element.

19. Arrangement according to claim 2, wherein a portion of said shattering protection element is arranged between said holding element and said pane.

20. Arrangement according to claim 2, wherein said pane and said shattering protection element together are connected, via the adhesive connection, with said one of the vehicle body and said holding element connected with said vehicle body.

21. Arrangement according to claim 2, wherein said pane is connected, only via said shattering protection element, to said one of the vehicle body and said holding element connected with said vehicle body.

22. Arrangement according to claim 4, wherein said shattering protection element is connected with the adhesive connection in at least segments of said peripheral region.

23. Arrangement according to claim 4, wherein said permanently elastic adhesive connection is provided in said peripheral region of said pane.

24. Arrangement according to claim 2, wherein said permanently elastic adhesive connection has at least one of a shore A hardness from 30 to 70, a tensile strength of 1 to 10 $N/mm^2$ and a tearing resistance of 300-600%.

25. Arrangement according to claim 1, wherein said adhesive connection is an adhesive band.

26. Arrangement according to claim 1, wherein said functional element is a solar cell composite.

27. Arrangement according to claim 1, wherein said holding element is a reinforcing frame.

28. Arrangement according to claim 2, wherein said pane is a glass panel for a roof opening.

29. Arrangement according to claim 27, wherein said holding element is an inner roof panel frame.

30. Arrangement according to claim 2, wherein said pane is made of thermally pre-stressed safety glass.

31. Arrangement according to claim 3, wherein said means for increasing the strength of the connection is a primer system which is applied to at least a surface of said shattering protection element facing said pane.

32. Arrangement according to claim 3, wherein said means for increasing the strength of the connection is an elevated structure applied to at least a surface of said shattering protection element facing said pane.

33. Arrangement according to claim 32, wherein said elevated structure is formed by elements which penetrate through openings provided within said shattering protection element and which project at at least one side said shattering protection element.

34. Arrangement according to claim 33, wherein said penetrating elements are formed by at least one elongated structure passing alternately through openings provided within said shattering protection element.

35. Arrangement according to claim 34, wherein said elongated structure forms eyelets at both sides of said shattering protection elements.

36. Method for manufacturing an arrangement for closing an opening of a vehicle, comprising the steps of fixing a shattering protection element to one of a panel a functional element fixed at said pane, and connecting said pane and said shattering protection element via a permanently elastic adhesive connection to one of a vehicle body and a holding element which is connectable connected to said vehicle body; wherein the shattering protection element is a protective foil composite, an end portion of which is immersed in the adhesive connection with the immersed end portion being out of contact with the pane at a location below the pane and inward from a peripheral edge of the pane.

37. Method for manufacturing an arrangement for closing an opening of a vehicle, comprising the steps of fixing a shattering protection element over its entire surface to one of a pane and a functional element fixed at said pane, connecting said shattering protection element via a permanently elastic adhesive connection to one of a vehicle body and a holding element which is connectable to said vehicle body, and wherein said shattering protection element is provided, prior to the connecting step, with means for increasing the strength of the connection between said shattering protection element and the adhesive connection; wherein the shattering protection element is a protective foil composite, an end portion of which is immersed in the adhesive connection with the immersed end portion being out of contact with the pane at a location below the pane and inward from a peripheral edge of the pane.

38. Method for manufacturing an arrangement for closing an opening of a vehicle, wherein a shattering protection element is fixed to one of a pane and a functional element fixed at said pane, comprising the steps of connecting said shattering protection element via a permanently elastic adhesive connection to a holding element which is to be connected to said vehicle body, and wherein prior to the connecting step, providing a surface of said shattering protection element with means for increasing the strength of the connection between said shattering protection element and said adhesive connection; wherein the shattering protection element is a protective foil composite, an end portion of which is immersed in the adhesive connection with the immersed end portion being out of contact with the pane at a location below the pane and inward from a peripheral edge of the pane.

39. Method for manufacturing an arrangement for closing an opening of a vehicle, wherein at least two separate shattering protection elements are fixed side by side to a pane or a functional element fixed at said pane, comprising connecting said shattering protection elements via an adhesive connection to one of a vehicle body and a holding element which is to be connected with said vehicle body; wherein the shattering protection element is a protective foil composite, an end portion of which is immersed in the adhesive connection with the immersed end portion being out of contact with the pane at a location below the pane and inward from a peripheral edge of the pane.

40. Method according to claim 36, wherein said adhesive connection is produced using an adhesive band.

* * * * *